United States Patent
Liu et al.

(10) Patent No.: US 8,504,840 B1
(45) Date of Patent: *Aug. 6, 2013

(54) CONTENT DEFACEMENT PROTECTION SYSTEM

(75) Inventors: Zaide Liu, Cupertino, CA (US);
Maurice Johnny Cinquini, San Jose, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/323,469

(22) Filed: Dec. 12, 2011

Related U.S. Application Data (63) Continuation of application No. 11/062,203, filed on Feb. 17, 2005, now Pat. No. 8,145,908.

(60) Provisional application No. 60/627,798, filed on Oct. 29, 2004.

(51) Int. Cl.
*H04L 29/06* (2006.01)

(52) U.S. Cl.
USPC ............ 713/176; 713/155; 713/170; 705/75; 709/203; 709/217

(58) Field of Classification Search
USPC ........... 713/155, 170, 176; 705/75; 709/203, 709/217
See application file for complete search history.

(56) References Cited

U.S. PATENT DOCUMENTS

| | | | |
|---|---|---|---|
| 6,141,753 A | 10/2000 | Zhao et al. | |
| 6,735,694 B1 * | 5/2004 | Berstis et al. | 713/178 |
| 7,363,361 B2 * | 4/2008 | Tewari et al. | 709/223 |
| 7,392,393 B2 * | 6/2008 | Taki | 713/176 |
| 7,552,338 B1 * | 6/2009 | Swildens et al. | 713/176 |
| 7,685,425 B1 * | 3/2010 | Wright et al. | 713/176 |
| 8,145,908 B1 * | 3/2012 | Liu et al. | 713/176 |
| 8,225,085 B2 * | 7/2012 | Karandikar | 713/153 |
| 2002/0013825 A1 * | 1/2002 | Freivald et al. | 709/218 |
| 2003/0028777 A1 * | 2/2003 | Hennessey et al. | 713/176 |
| 2004/0003248 A1 * | 1/2004 | Arkhipov | 713/170 |
| 2005/0125660 A1 * | 6/2005 | Raciborski | 713/161 |

(Continued)

FOREIGN PATENT DOCUMENTS

WO WO 03103214 A1 * 12/2003

OTHER PUBLICATIONS

U.S. Appl. No. 11/062,203 (Available in USPTO IFW system.).
Zhao, Jian; Applying Digital Watermarking Techniques to Online Multimedia Commerce; Proc. of the Int'l Conference on Imaging Sciences, Systems, and Applications, Las Vegas, Jun. 30-Jul. 3, 1997. 7 pages.

*Primary Examiner* — Nathan Flynn
*Assistant Examiner* — Sarah Su
(74) *Attorney, Agent, or Firm* — Joshua T. Matt (57) ABSTRACT

A method and mechanism for protecting a website against defacement are provided. A content owner may associate content with a digital signature. The digital signature allows a recipient of the content to verify that the content originated from the content owner, and that the content has not been defaced. The digital signature may be comprised within the content, or stored external to the content, e.g., in a repository accessible to a Web cache server serving the content. To construct the digital signature, initially, the content owner creates a content validity value for a portion of content, the content validity value is encrypted to create the digital signature. The Web cache server may use the digital signature to determine whether the content has been defaced.

21 Claims, 7 Drawing Sheets

U.S. PATENT DOCUMENTS

2008/0256359 A1* 10/2008 Kahn et al. .................. 713/170
2010/0128918 A1* 5/2010 Macwan ...................... 382/100
2011/0078327 A1* 3/2011 Li et al. ....................... 709/238
2012/0324227 A1* 12/2012 Swildens et al. ............. 713/172

* cited by examiner

CONTENT DEFACEMENT PROTECTION SYSTEM

RELATED APPLICATION DATA

This application is a continuation of U.S. application Ser. No. 11/062,203, filed Feb. 17, 2005 (now U.S. Pat. No. 8,145, 908), which claims the benefit of priority of Provisional U.S. Patent Application No. 60/627,798, filed Oct. 29, 2004, the teachings of both of which are incorporated herein by reference.

FIELD OF THE INVENTION

The present invention relates to protecting Web content against defacement by a third party.

BACKGROUND

The Internet has proven to be a popular and effective method of distributing content. For example, many people access one or more Web sites on the World Wide Web (WWW) each day. Numerous types of content may be accessed using the Internet, such as a Web page, an image file, and streaming video, to name a few examples.

One of the problems facing content delivery over any network, such as the Internet, is the act of defacement. Defacement is the unauthorized modification of content by a third party, such as a "hacker." Content may be defaced by any unauthorized change, such as any deletion or addition to any portion of the content. Content may be defaced while it is stored at a server or during delivery to a requestor. In some cases, content that has been defaced may be visually different than the original version of the content, e.g., a Website that is defaced may display different images or text. In other cases, content that has been defaced may visually appear the same as the original version of the content, but the defaced version of the content may contain spyware, adware, a computer virus, or other unwanted mechanisms.

One approach for addressing content defacement is to periodically monitor the content via a "content monitor" using a checksum method. To illustrate how a checksum works in one approach, assume that a "content monitor" monitors the content defacement of an origin server. The content monitor may periodically verify that the content obtained from the origin server ("the received content") has not been defaced by contacting the origin server to obtain a checksum value that is associated with the received content. The content monitor also generates a checksum value for the received content. If the checksum value generated by the content monitor for the received content is different than the checksum value obtained from the origin server that is associated with the received content, then the received content has been defaced.

Using a checksum to detect content defacement via a content monitor has several disadvantages. First, if the amount of time between the first time a content monitor contacts the origin server to obtain a checksum value to verify whether content has been defaced and the next time the content monitor contacts the origin server to obtain a checksum value to verify whether content has been defaced, is too great, then there is a chance if the content is defaced, the defaced content will be delivered to a requestor before the defacement is detected.

Second, if the amount of time between the first time a content monitor contacts the origin server to verify whether content has been defaced and the next time the content monitor contacts the origin server to verify whether content has been defaced, is too small, then the content monitor generates an excessive amount of traffic between the content monitor and the origin server, thereby creating an excessive demand on the resources of both the origin server and the content monitor.

Third, any time that content needs to the updated at the origin site, the mechanism at the content monitor for monitoring the corresponding checksum value at the origin server must be notified, thereby creating additional steps and burdens on the content monitor. Finally, the use of a checksum requires that the content be available prior to the request for that content, so checksums cannot be used for content that is dynamically generated.

Another approach for addressing content defacement involves the use of a watermark. A watermark, as used in this context, is a first piece of content that a second piece of content must contain in order for the second piece of content to be deemed valid, i.e., not defaced. Any content that does not contain the watermark is automatically prevented from being delivered to a requestor of that content. For example, a company may establish a company logo as a watermark, and thereafter only Web pages that include the watermark of the company logo may be delivered to a requestor.

Unfortunately, the use of a watermark to detect content defacement also has several disadvantages. First, content may contain a watermark and still be defaced. For example, the text of a company Web page may be modified, but the Web page may still include the watermark. Also, a watermark may be easily forged by a third party, thereby allowing others to circumvent the use of a watermark to prevent the unauthorized distribution of content to requestors.

Consequently, techniques for protecting a Website against defacement by a third party that do not incur the disadvantages of the above approaches are desirable. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the embodiments of invention described herein. It will be apparent, however, that embodiments of the invention may be practiced without these specific details. In other instances, well-known structures and devices are shown in block diagram form in order to avoid unnecessarily obscuring the description of embodiments of the invention.

Functional Overview

Techniques are discussed herein for protecting Website content against defacement. Embodiments of the invention allow a content owner to associate content with a digital signature. A content delivery network (CDN) hides the content owner's origin Website from hackers by providing content to end-users. CDN Web cache servers validate Web page content using the signature before storing the content in local cache. This ensures that valid content is delivered to end-users. The digital signature allows a Web cache server that receives the content to verify (a) that the content was actually sent from a content owner's origin server, and (b) that the content has not been defaced. The digital signature may be comprised within the content, or the digital signature may be stored external to the content, e.g., in a repository accessible to the recipient of the content. The repository may be associated with additional security to prevent hackers from unauthorized access.

The content owner applies an algorithm to a portion of content to construct the digital signature. For example, if the content is a Web page, then the content owner may apply an algorithm to the entire Web page, or to just a portion, such as the first half of the Web page or to an image file referenced by the Web page. The result obtained after applying the algorithm to the portion of content is referred to as a content validity value.

An illustrative example of an algorithm that could be used by an embodiment of the invention is the MD5 algorithm, which generates an output value called a message digest (referred to herein as a content validity value) based on a set of input text.

The algorithm employed by embodiments of the invention may be designed such that if the algorithm is applied to an unmodified version of content and also to a modified version of the same content, then different content validity values will be produced because the input text for each is different. Thus, if different content validity values are obtained after the algorithm is applied to an original version of content and a supplied version of content (which may or may not be defaced), the supplied version of content may be determined to be defaced.

After the content owner generates the content validity value for the portion of content, the content owner may encrypt the content validity value to create the digital signature. For example, the content owner may encrypt the content validity value with a private key to create the digital signature. Thereafter, the content owner may associate the digital signature to the content by inserting the digital signature into the content, or by making the digital signature accessible to an intended recipient of the content, e.g., by storing the digital signature in a repository accessible to the recipient of the content. Once the recipient decodes the digital signature to obtain a supplied content validity value, the recipient may apply the same algorithm to the same portion of the received content used to generate the supplied content validity value to obtain a determined content validity value. Thereafter, the recipient may determine if the determined content validity value is the same as the supplied content validity value contained in the digital signature. If the supplied content validity value contained in the digital signature is the same value as the determined content validity value generated by the recipient, then the content has not been defaced since the content left the control of the content owner. Once the content has been identified as being defaced, numerous actions may be taken, as described below.

Architecture Overview

Figure 1:
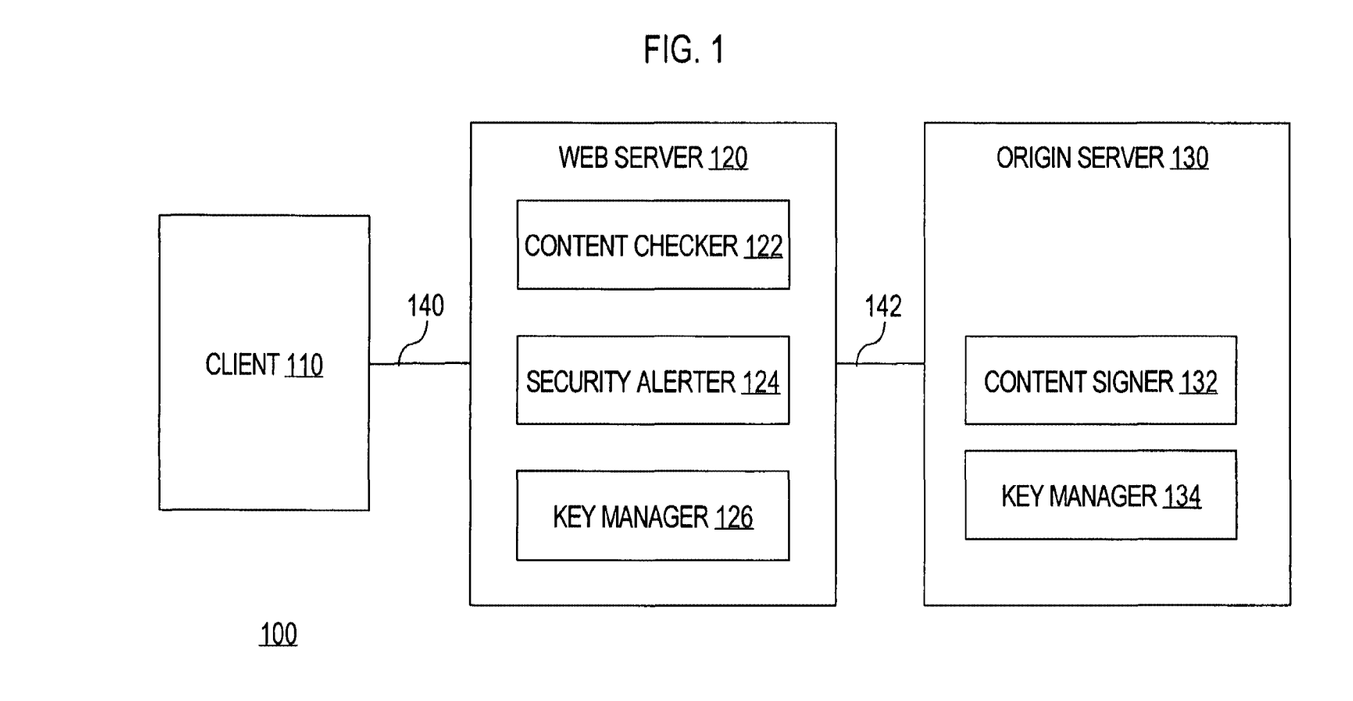
FIG. 1 is a block diagram illustrating a Web content defacement protection embodiment of the invention according to an embodiment of the invention.

FIG. 1 is a block diagram illustrating a system 100 according to an embodiment of the invention. System 100 may be used to protect Website content against defacement. Defacement can occur during any step of the process:

Content creation→Staging→distribution to origin servers→CDN delivery

Additionally, the system 100 protects against accidental content corruption such as incomplete file transfers, etc.

System 100 allows a content owner to associate content with a digital signature, which has numerous advantageous applications as discussed below. As used herein, the term "content" is broadly used to refer to any digital content that may be requested from a server, including, but not limited to, a Web page, a plain text document, an image, an audio file, and a video file. In an embodiment, system 100 includes a client 110, a Web cache server 120, an origin server 130, and communications links 140 and 142. Each component of system 100 shall be discussed below.

A client, such as client 110, may be implemented by any medium or mechanism that provides for receiving content from origin server 130. Examples of client 110 include, without limitation, a Web browser, a cell phone, a personal digital assistance (PDA), a personal computer (PC), a network appliance, and a wireless device. While only one client 110 is illustrated in FIG. 1 for ease of explanation, embodiments of the invention may feature any number of clients 110 in system 100.

A Web cache server, such as Web cache server 120, may be implemented by any medium or mechanism that provides for serving content to client 110, for example, a CDN Web cache server described below. Web cache server 120 obtains content to serve to client 110 from numerous sources, such as origin server 130. While only one Web cache server is shown in FIG. 1, system 100 may comprise any number of Web cache servers.

Web cache server 120 includes several functional components, namely content checker 122, security alerter 124, and key manager 126. Content checker 122 is a functional component that may be implemented by any medium or mechanism that provides for decoding a digital signature and applying an algorithm to a portion of content to produce a determined content validity value. The content checker 122 is used by the Web cache server 120 to verify (a) that received content was actually sent from the content owner, and (b) that received content has not been defaced.

In one embodiment, Internet Service Providers (ISPs) may incorporate a content checker 122 in their proxies or routers to perform the functions performed by content checker 122. In another embodiment, content checker 122 may be implemented by integrating the functionality performed by the content checker 122 into a HTTP server. The HTTP server should have additional security measures against hackers, because if a hacker takes over the HTTP server, then the hacker could modify the functions performed by content checker 122, e.g., the hacker could bypass the checking of digital signatures to allow defaced content to be served to requestors.

Security alerter 124 is a functional component that may be implemented by any medium or mechanism that provides for alerting an administrator that either (a) that received content was actually sent from the content owner, or (b) that received content has been defaced.

A key manager, such as key manager 126 and key manager 134, is a functional component that may be implemented by any medium or mechanism that provides for allowing an administrator to manage a set of keys, such as public and private keys or secret keys. Key manager 126 allows an administrator to manage a set of keys associated with the Web cache server 120, and key manager 134 allows an administrator to manage set of keys associated with the origin server 130.

An origin server, such as origin server 130, may be implemented by any medium or mechanism that provides for supplying content that may be requested by a client 110.

Origin server 130 includes a content signer 132 and key manager 134. Content signer 132 is a functional component that may be implemented by any medium or mechanism that provides for creating a digital signature to be associated with content. The content signer 132 may also apply an algorithm to a portion of the content to produce a supplied content validity value. A content owner uses the content signer 132 to encrypt the supplied content validity value to create a digital signature, associated with a portion of content, which allows the recipient of the content to verify that the content originated with the content owner and has not been defaced.

Communications link 140 may be implemented by any medium or mechanism that provides for the exchange of data between client 110 and Web cache server 120. Communications link 142 may be implemented by any medium or mechanism that provides for the exchange of data between Web cache server 120 and origin server 130. Examples of communications links 140 and 142 include, without limitation, a network such as a Local Area Network (LAN), Wide Area Network (WAN), Ethernet or the Internet, or one or more terrestrial, satellite or wireless links.

Figure 6:
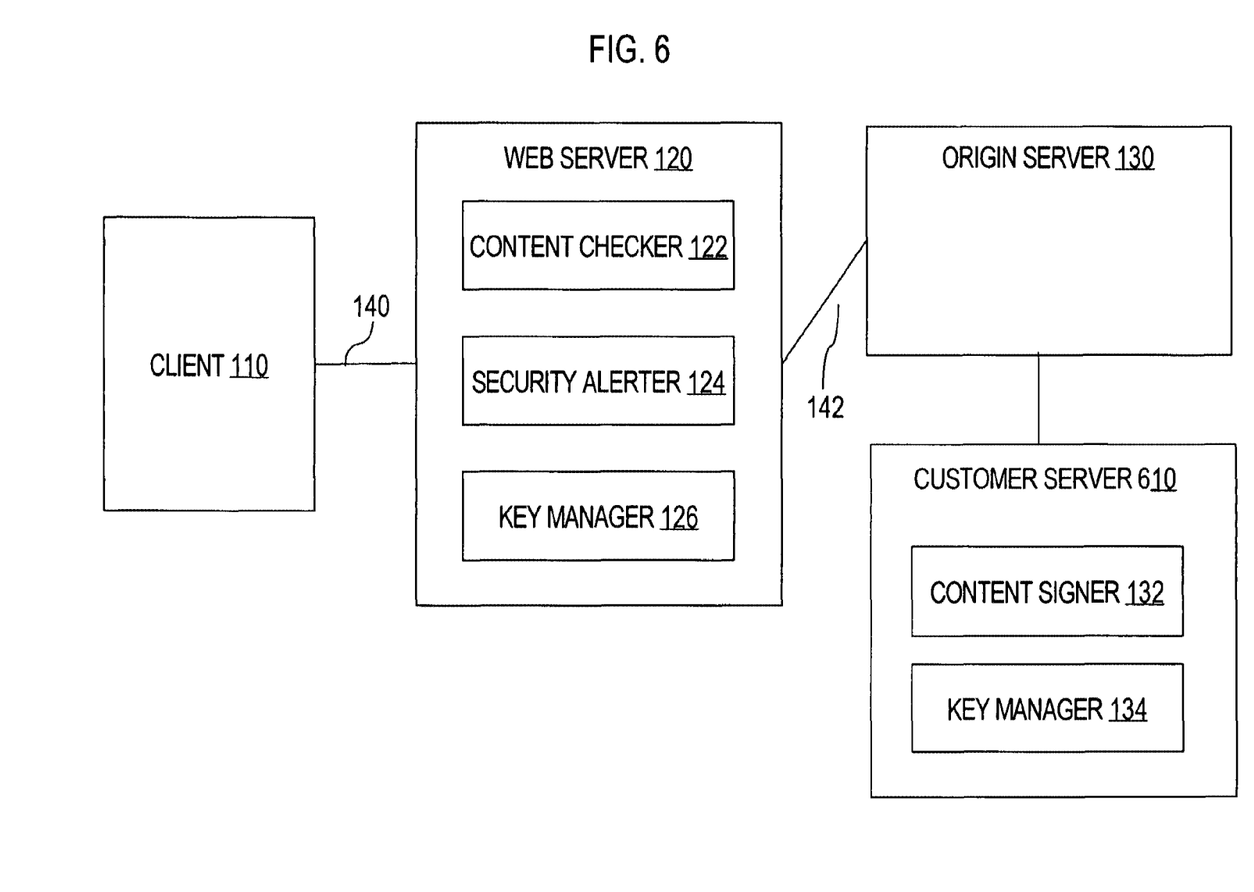
FIG. 6 is a block diagram illustrating a Web content defacement protection embodiment of the invention using a customer server according to an embodiment of the invention.

FIG. 6 illustrates an alternative embodiment where the customer server 610 includes a content signer 132 and key manager 134. The content signer 132 and key manager 134 function as described above and below. The difference between FIG. 1 and FIG. 6 is that the customer server 610 is located in the customer's intranet which is much more secure than the origin server 130 that is connected to an external network, such as the Internet. As above, the content signer 132 may apply an algorithm to a portion of the content to produce a supplied content validity value. The content owner uses the content signer 132 to encrypt the supplied content validity value to create a digital signature, associated with a portion of content, which allows the recipient of the content to verify that the content originated with the content owner and has not been defaced. The content is passed to the origin server 130 for dissemination to Web cache servers, such as Web cache server 120. The customer does not have to worry about the Web cache server 120 being defaced and not caught by the system because all of the signatures for the customer's content are created on a secure customer server 610 within, and protected by, an intranet. The customer's server 610 has very little chance of being taken over by an intruder and creating defaced content with valid signatures. Any changes to the content that are not signed by the customer server 610 will be immediately detected by the Web cache server 120.

While FIGS. 1 and 6 provide an illustrates architecture for an embodiment of the invention, the functions of (a) creating a digital signature and (b) validating a digital signature may both be performed on other components than discussed above. For example, a digital signature may either be created or validated at a variety of locations, including the origin server 130 and at an Internet Service Provider. In an embodiment discussed below, one or more of content checker 122, security alerter 124, and key manager 126 may be located at client 110, instead of Web cache server 120. For example, the content checker 122 may be located in an HTTP server or an Internet Service Provider's proxy, router, or Web intermediary, etc. Consequently, embodiments of the invention are not limited to the components of content checker 122, security alerter 124, and key manager 126 residing in Web cache server 120 as illustrated in FIGS. 1 and 6.

Figure 4:
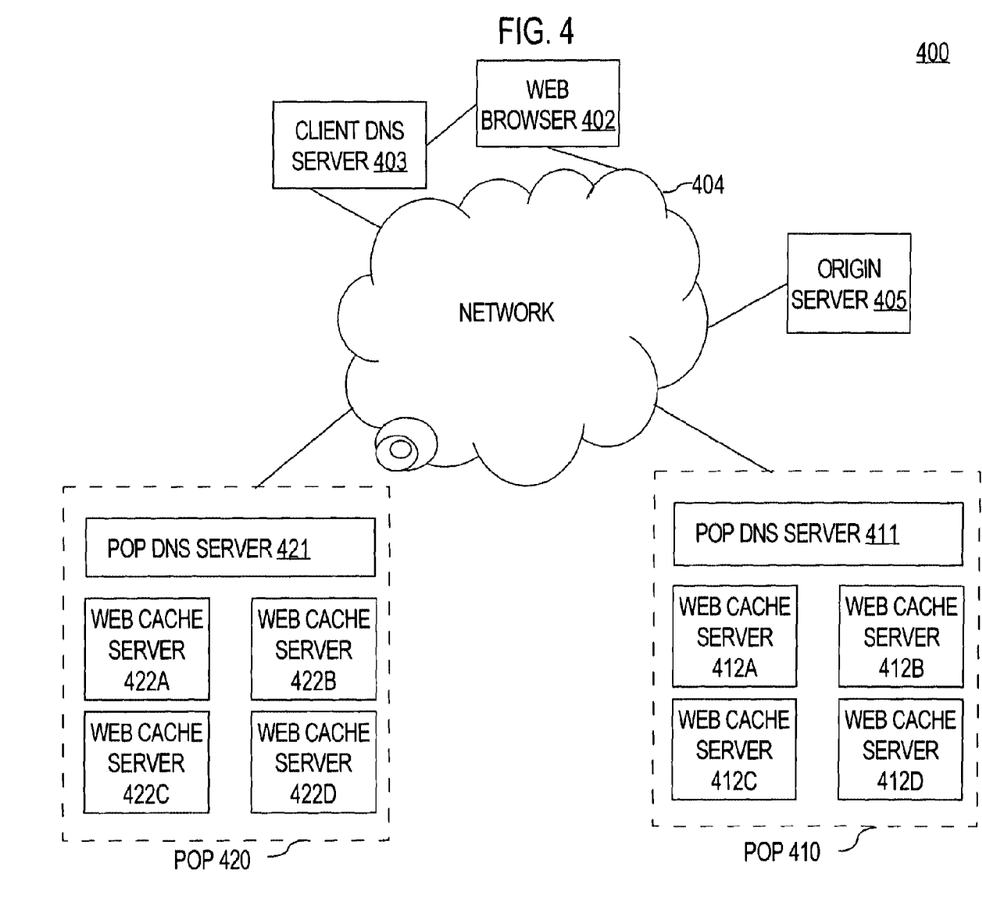
FIG. 4 is a block diagram illustrating a Content Delivery Network implementing an embodiment of the invention according to an embodiment of the invention.

FIG. 4 is a block diagram illustrating a system 400 that incorporates a CDN network. An embodiment of the invention can be implemented in a CDN system as described in U.S. Pat. Nos. 6,405,252, 6,754,706, 6,484,143, 6,754,699, and 6,694,358, all owned by the Applicant and incorporated herein by reference. A plurality of Point of Presence sites (POPs) are distributed across the network 404. Here two POPs 410 and 420 are shown. The network 404 is typically the Internet, but can be any other large scale network such as an enterprise intranet.

Each POP 410, 420 contains a POP DNS server 411, 421 and plurality of Web cache servers 412A-412D, 422A-422D. Operationally, a Web cache server caches cacheable CDN customer content such as images, video, documents, and static Web page content obtained from the customer's origin server 405 and serves the cached content to client systems. The origin server 405 serves dynamic content to the client system 405. The Web cache server can also operate as a mirror server, serving all of the content of an origin server 405.

When a client makes a request for Web content through its Web browser 402, the request is sent to the client's local DNS server 403 for resolution of the host name. For example, Web browser 402 may transmit a request to resolve the host name of "www.customer.com" to client DNS server 403. The client DNS server 403 sends a domain name resolution request to a customer DNS server. Since the customer DNS server is configured to delegate its domain to a POP DNS as the authoritative DNS, it tells the client DNS server 403 to contact the authoritative POP DNS IP address for resolution of the request. The client DNS server 403 then sends the request to the authoritative POP DNS server 411.

The authoritative POP DNS server 411 finds an appropriate Web cache server within the Web cache servers 412A-412D in the POP to serve the content to the client based on factors such as traffic load, latency, whether the server is more likely to have the content cached, etc. The authoritative POP DNS server 411 returns the IP address of the Web cache server (e.g., 412A) to the client DNS server 403. The client DNS server 403 sends the address to the client Web browser 402.

Once the client Web browser 402 receives the IP address of the Web cache server 412A, it sends a request for Web content to the Web cache server 412A. The Web cache server 412A receives the request and searches its cache for the requested content. If the requested content is found in the Web cache server's cache, then the content is sent to the client Web browser 402. If the content is not found in the Web cache server's cache, then the Web cache server 412A can request the content from the origin server 405.

Content is checked for defacement whenever the Web cache server receives content from the origin server. There are several conditions where content is transferred from the origin server 405 to a Web cache server:

1) The Web cache server requests content from the origin server 405.

2) Content is pushed to the Web cache server from the origin server 405.

The actions that the Web cache server takes upon detection of defaced content are described below. The customer is charged a fee for the use of the CDN. An additional fee may be charged to the client for the Web content defacement detection service.

Protecting Website Content Against Defacement

Figure 2:
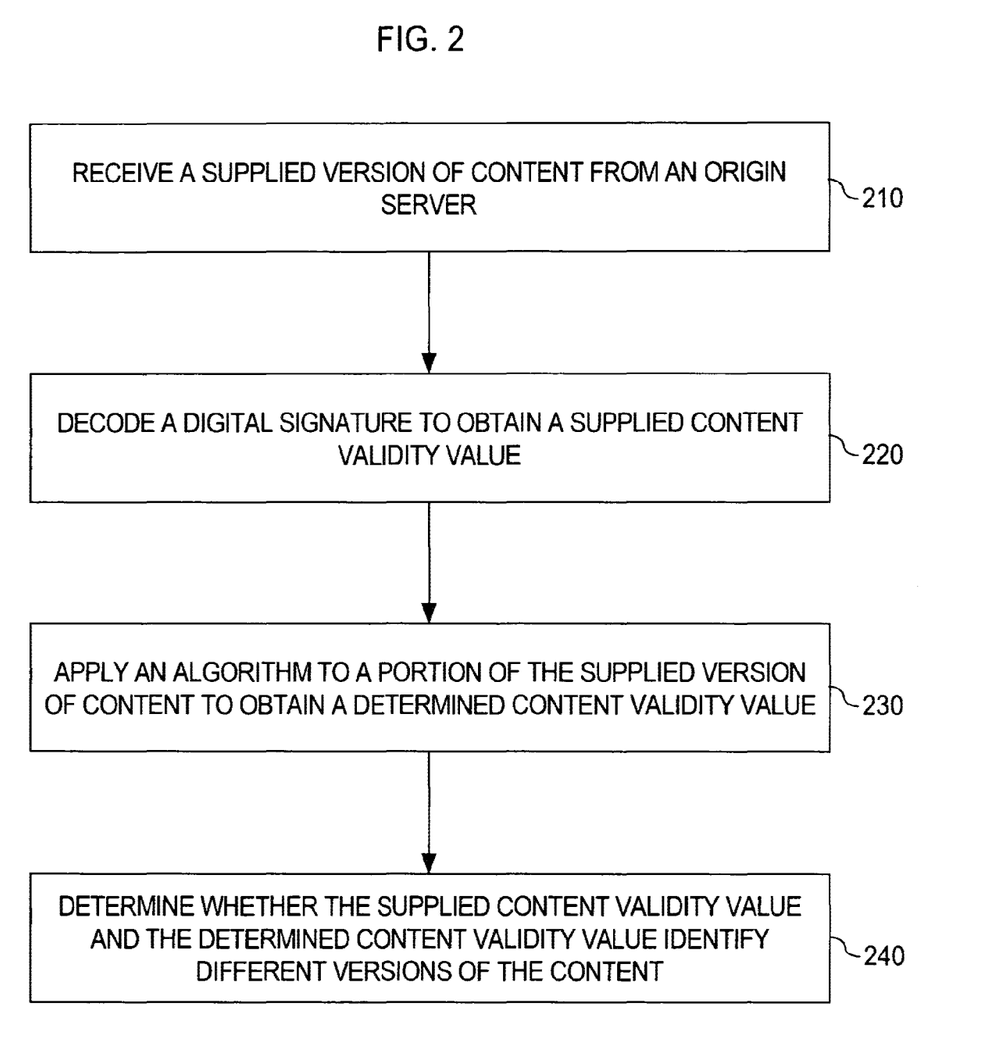
FIG. 2 is a flowchart illustrating the functional steps performed by an embodiment of the invention.

FIG. 2 is a flowchart illustrating the functional steps performed by an embodiment of the invention. By performing the functional steps illustrated in FIG. 2, a recipient of content may verify (a) that the content originated from the content owner, and (b) that the content has not been defaced.

Initially, in step 210, a supplied version of content from origin server 130 is received. Step 210 may be performed by origin server 130 sending the supplied version of content to Web cache server 120 over communications link 142.

The Web cache server 120 is responsible for serving content to client 110 in response to receiving a request for content from client 110. When Web cache server 120 receives a request for content from client 110, Web cache server 120 initially attempts to serve the requested content from the cache of Web cache server 120. If the Web cache server 120 does not have a valid copy of the requested content stored in its cache, then the Web cache server 120 contacts the origin server 130 to obtain a copy of the requested content. Thereafter, the Web cache server 120 stores a copy of the requested content in the cache of the Web cache server 120, and provides the requested content to the client 110.

In an embodiment, the Web cache server 120 may be associated with a CDN service, which is a service that is responsible for serving the content of CDN customers to clients. For example, company ABC (associated with origin server 130) may hire a content delivery service (associated with Web cache server 120) to serve their content to clients 110. Such a relationship may be advantageous to company ABC because the Web cache server 120 may be associated with more security mechanisms to prevent hackers from defacing content than the origin server 130. Consequently, such an embodiment advantageously provides the content owner a high degree of protection against hackers, and further allows an administrator of Web cache server 120 to determine if any supplied content received from origin server 130 has been defaced before serving the content to requestors.

The supplied version of content received by Web cache server 120 from the origin server 130 is associated with a digital signature. The process of creating the digital signature shall now be discussed. In an embodiment, the process of creating a digital signature is performed by content signer 132, and involves two steps: (1) applying an algorithm to a portion of the content to produce a content validity value, and thereafter (2) encrypting the supplied content validity value to produce the digital signature. Each of these steps shall be discussed in further detail below.

Calculating a Content Validity Value for a Portion of Content

In an embodiment, content signer 132 applies an algorithm to a portion of content to produce a content validity value. The portion may include all or part of the content. The content validity value produced by the content signer 132 shall be referred to herein as the supplied content validity value. The input to the algorithm may be text, such as the characters of a Web page. The input to the algorithm may also be the bytes representing the digital content. For example, a digital audio file and digital video file are each represented by bytes of digital data. The bytes of digital data of the digital audio file and the digital video file may also be an input into the algorithm.

In one embodiment, the algorithm employed by the content signer 132 is MD5. The MD5 algorithm takes as input a message of arbitrary length and produces as output a 128-bit "message digest" of the input. The message digest output of the MD5 algorithm is the content validity value. It is conjectured that it is computationally infeasible to produce two messages having the same message digest, or to produce any message having a given pre-specified target message digest using the MD5 algorithm.

The significance of the supplied content validity value is that it may be used by the content checker 122 to determine whether content that was sent from the origin server 130 to the Web cache server 120, has been defaced. After the supplied content validity value is produced by the content signer 132, the supplied content validity value is encrypted as explained below.

Encrypting the Content Validity Value to Produce the Digital Signature

Once the content signer 132 produces the supplied content validity value for a portion of content, the content signer 132 encrypts the supplied content validity value to produce the digital signature. The content signer 132 may use a variety of mechanisms to encrypt the content validity value. In one embodiment, the content validity value may be encrypted using a private key to a digital signature. A digital signature that is encrypted using a private key may be decoded using a corresponding public key. The digital signature is encrypted so a hacker or defacer cannot easily add a valid digital signature to the content.

An administrator of origin server 130 may manage the keys used in encrypting the supplied content validity value to the digital signature using the key manager 134.

Other embodiments of the invention may utilize other methods of encrypting the supplied content validity value. In another embodiment, the content signer 132 may use a secret key shared between the CDN provider and the content provider to encrypt the supplied content validity value to produce the digital signature. The signature can be sent to the CDN provider (which distributes the signature to Web cache servers in the CDN network) through a different network channel for added security.

Associating the Digital Signature to the Content

Figure 5:
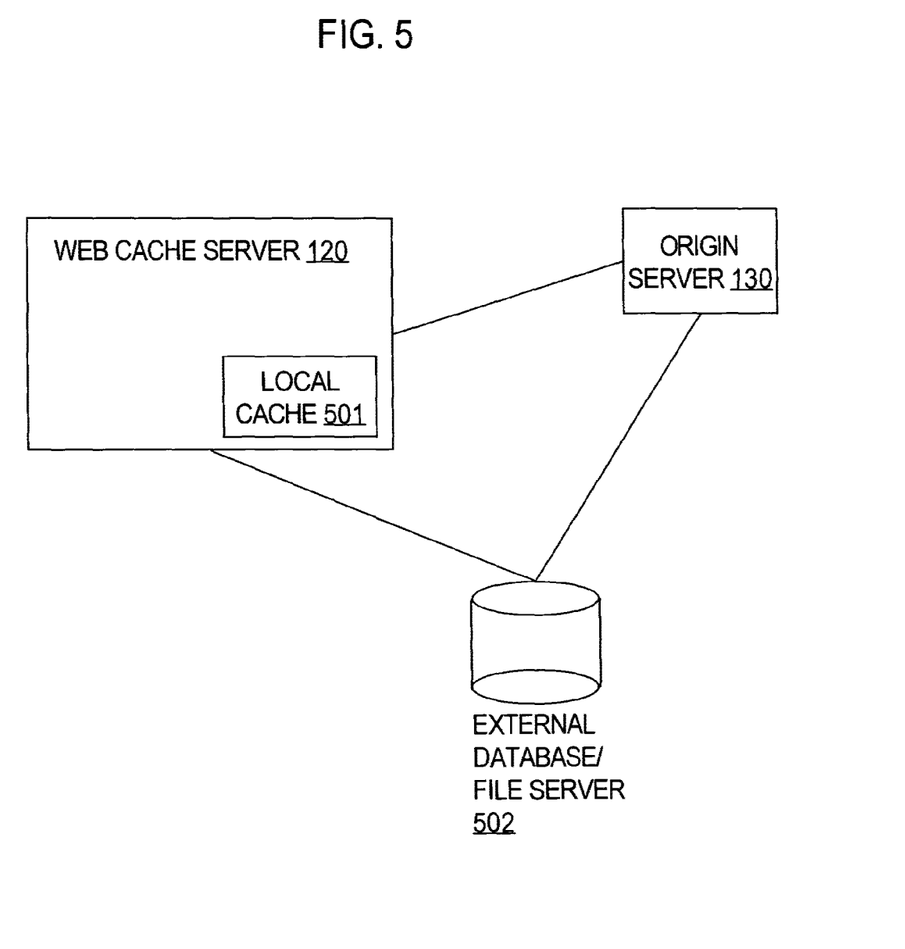
FIG. 5 is a block diagram illustrating a Web content defacement protection embodiment of the invention storing digital signatures in a database or file server according to an embodiment of the invention.

Once the content signer 132 generates the digital signature for a portion of content, the content signer 132 associates the digital signature to the portion of content. There are a variety of ways that the content signer 132 may associate the digital signature with the portion of content. In one embodiment, as shown in FIG. 5, the content signer 132 within the origin server 130 may store the digital signature in a persistent store, such as a database or a file server 502. The persistent store 502 is accessible to Web cache server 120. Thus, when the Web cache server 120 receives content from the origin server 130, the Web cache server 120 may access the persistent store to obtain the digital signature associated with the supplied version of content.

The origin server 130 may supply the Web cache server 120 with a content identifier when the origin server 130 transmits the supplied version of content to the Web cache server 120. The content identifier may be used by the Web cache server 120 to identify which digital signature stored in the persistent store 502 is associated with the supplied version of content. Alternatively, the Web cache server 120 may determine which digital signature stored in the persistent store 502 is associated with the supplied version of content based on the characteristics of the supplied version of content.

Figure 7:
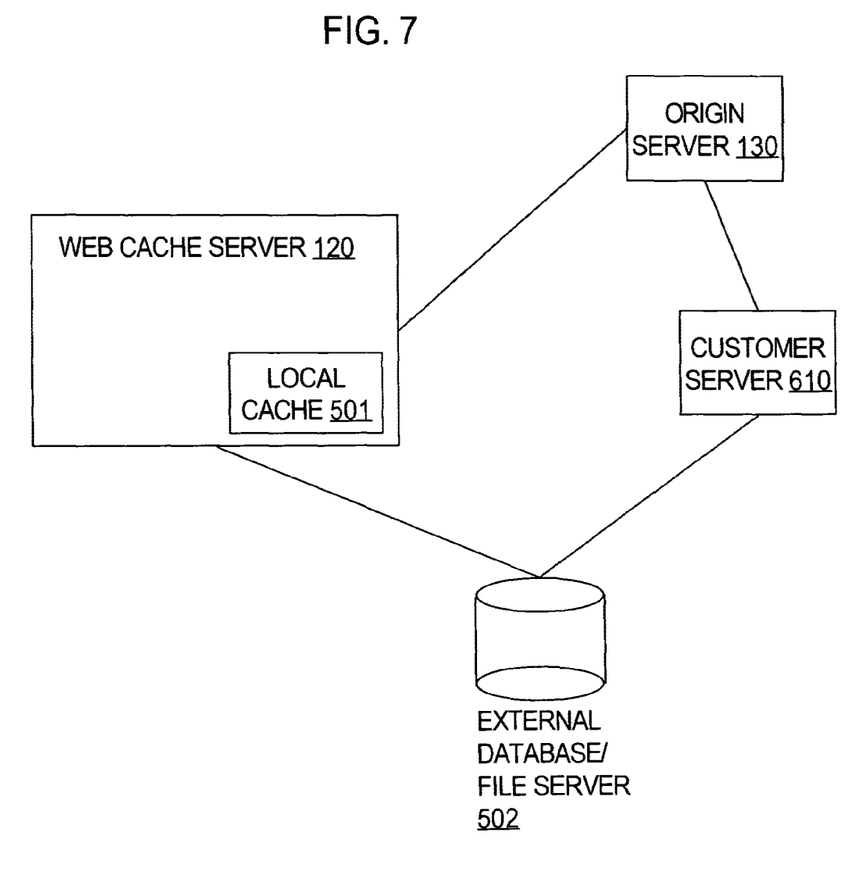
FIG. 7 is a block diagram illustrating a Web content defacement protection embodiment of the invention with a customer server storing digital signatures in a database or file server according to an embodiment of the invention.

FIG. 7 illustrates another embodiment where the content signer 132 within the customer server 610 may store the digital signature in a persistent store, such as a database or a file server 502. The persistent store 502 is accessible to Web cache server 120. The customer server 610 delivers content to the origin server 130. When the Web cache server 120 receives content from the origin server 130, the Web cache server 120 may access the persistent store to obtain the digital signature associated with the supplied version of content.

The origin server 130 may supply the Web cache server 120 with a content identifier when the origin server 130 transmits the supplied version of content to the Web cache server 120. The content identifier may be used by the Web cache server 120 to identify which digital signature stored in the persistent store 502 is associated with the supplied version of content. Alternatively, the Web cache server 120 may determine which digital signature stored in the persistent store 502 is associated with the supplied version of content based on the characteristics of the supplied version of content.

In yet another embodiment, the content signer 132 (within the origin server 130 or the customer server 610, as illustrated in FIGS. 5 and 7) inserts the digital signature into the portion of content. For example, content signer 132 may insert the digital signature into the beginning or end of a Web page, into a comment extension block of an image file, in an HTTP header, or in a portion of a video file or audio file that contains metadata instead of substantive data. The Web cache server 120 uses its local memory/cache 501 to temporarily store the content, and extract and evaluate the embedded digital signature.

For example, the digital signature may be inserted in the beginning of a HTML file by inserting the following text:

<!-- signature: eeqw13321uy243 -->

In the above example, the string "eeqw13321uy243" corresponds to the digital signature. As the digital signature is contained within an HTML comment field, the digital signature will not be visually rendered by a Web browser displaying the HTML file.

An HTML file must typically be protected in full. That is, if any portion of the HTML page is not included in any digital signature, then there can be some instructions that could replace any part of the visually rendered page with whatever the instructions want.

After the Web cache server 120 receives the supplied version of content from the origin server 130, processing proceeds to step 220.

Decoding a Digital Signature to Obtain a Supplied Content Validity Value

In step 220, the content checker 122 retrieves the digital signature associated with the supplied version of content, and thereafter the content checker 122 decodes the digital signature to obtain the supplied content validity value. In an embodiment, step 220 may be performed at the Web cache server 120 by the content checker 122.

As explained above, the content signer 132 may encrypt the supplied content validity value using a variety of mechanisms. If the content signer 132 encrypted the supplied content validity value using a private key, then the digital signature may be decoded in step 220 using a public key. If the content signer 132 encrypted the supplied content validity value using a secret shared key, then the digital signature may be decoded in step 220 using the secret shared key. Other mechanisms may be used to encrypt/decode the digital signature other than those discussed above.

As a result of performing step 220, the content checker 122 obtains the supplied content validity value from the decoded digital signature. After the performance of step 220, processing proceeds to step 230.

Determining a Content Validity Value at the Web Server

In step 230, the content checker 122 applies the encryption algorithm to a portion of the supplied version of content to obtain a determined content validity value. The portion of the supplied version of content that the content checker 122 applies the algorithm to is the same portion of the supplied version of content that the origin server applied the algorithm to in creating the supplied content validity value. Consequently, unless the supplied version of content has been defaced, the determined content validity value should be equivalent to the supplied content validity value.

For example, assume the content signer 132 applied the encryption algorithm to a sequence of bytes representing a set of digital frames corresponding to the first 10 seconds of a video file to produce the supplied content validity value. In step 230, the content checker would also apply the same algorithm to a sequence of bytes representing the same set of digital frames to produce the determined content validity value. Unless the video file has been defaced, the input to the algorithm is the same, and the supplied content validity value should be equivalent to the determined content validity value.

After the performance of step 230, processing proceeds to step 240.

Determining if the Supplied Version of Content has been Defaced

In step 240, a determination is made as to whether the supplied version of content has been defaced. Step 240 may be performed by the content checker 122. This determination can be made by determining whether the supplied content validity value and the determined content validity value are the same. If the supplied content validity value and the determined content validity value are the same value, then the supplied content validity value and the determined content validity value identify the same version of a portion of the content. Once the entire content is checked (if there are multiple portions of content) and all portions are correct, then the supplied version of content has not been defaced.

However, if the supplied content validity value and the determined content validity value are different values, then the supplied content validity value and the determined content validity value identify different versions of a portion of the content. Consequently, the supplied version of content has been defaced.

Thus, if the visual appearance of a Web page has changed, then the bytes representing the Web page will have changed. Also, if spyware, adware, a computer virus, or other unwanted mechanism has been added to the supplied version of content, then likewise the bytes representing the supplied version of content will have changed. In either case, since the input to the algorithm is different than the original version of a portion of the content, the determined content validity value will be different than the supplied content validity value, thereby evidencing the defacement.

Upon detecting the defacement, a Web cache server may:

1) Deliver a saved valid version of the content to the requesting client system.

2) Deliver an older existing version of the content in cache to the requesting client system.

3) Deliver a content provider's default Web page to the requesting client system.

4) Deliver a security announcement page to the requesting client system.

5) Deliver the defaced content anyway (Assuming that the content provider may have forgotten to update the content validity value—this can be configured by the CDN customer or the CDN administrator).

6) Deliver a validated version of the content from an alternate origin server.

The Web cache server's action is configurable by the CDN customer or the CDN administrator via the CDN configuration interface.

In an embodiment, if the content checker 122 determines that the supplied version of content has not been defaced, then the content checker 122 may remove the digital signature from the supplied version of content before the Web cache server 120 serves the supplied version of content to the client 110. In this way, the mechanism that the Web cache server 120 uses to verify (a) that the content was actually sent from the content owner, and (b) that the content has not been defaced, is transparent to the client.

Actions Performed when the Content has been Defaced

If, after the performance of step 240, it is determined that the supplied version of content has been defaced, then the security alerter 124 may notify an administrator that the supplied content has been defaced.

Security alerter 124 may notify an administrator that the supplied content has been defaced using any method of communication. For example, security alerter 124 may communicate with an administrator using one or more of the following modes of communication: sending an email to an administrator, paging an administrator, displaying a message on an administrator interface accessible to an administrator, transmitting a voice-mail to an administrator, issuing a SNMP trap, and calling an administrator on the telephone to play a recorded message. Once the administrator is notified that the supplied content has been defaced, the administrator may take action to correct the defacement.

In another embodiment, Web cache server 120 may store a backup version of content supplied by the origin server 130. Once the content checker 122 determines that the supplied content has been defaced, the backup version of the supplied content may be provided to the requesting client 110, instead of the defaced version of content.

In another embodiment, once the content checker 122 determines that the supplied content has been defaced, the Web cache server 120 may transmit a request to another origin server for a new version of the supplied content. The assumption is that the origin server 130 has been compromised and the content from another origin server has not been defaced (until proven otherwise). The Web cache server 120 can request a new version of content from any of the CDN customer's origin servers or can be configured to make requests to a set of servers (e.g., origin servers may be designated as primary and secondary sources).

In another embodiment, the Web cache server 120 may maintain a log of content that has been defaced. Once the content checker 122 determines that the supplied content has been defaced, the Web cache server may record information about the defaced version of content in the log file. For example, the log file may record the URL of the defaced content and the time when the defacement was detected. The statistics recorded in the log file may also be stored in a database. An administrator may use the statistics to generate a periodic report describing the content that has been defaced.

In another embodiment, a version of the supplied content that is not defaced may be delivered to the requestor. In another embodiment, a default Web page associated with the content owner may be delivered to the requestor.

Embodiments of the invention may perform any action in response to determining that the supplied version of content has been defaced, including performing two or more of the above-discussed actions.

Associating Multiple Digital Signatures to the Supplied Version of Content

The supplied version of content that was requested by client 110 may comprise more than one file. For example, if client 110 requests a Web page, that Web page may contain three images. Thus, the Web page counts as a file and the three referenced images also count as files, resulting in a total of four files constituting the requested content.

In an embodiment, each file in the requested content is associated with a digital signature. Thus, in the above example involving a Web page, a digital signature is associated with the Web page, and each image referenced in the Web page is also associated with a digital signature. The process of associating a digital signature to an image is discussed in further detail in the next section.

Using a Digital Signature on an Image

As previously discussed, any file may be associated with a digital signature. In one approach of associating the digital signature to a file, the digital signature may be stored in a repository accessible to the Web cache server 120. In another approach, the digital signature may be inserted into the file.

For example, a digital signature may be inserted at the end of an image file or may be inserted into the comment extension block of an image file. If the signature is inserted at the end of an image file, the Web cache server must make sure to remove the signature before delivery to a client. The comment extension block contains information that is not visually rendered, but rather contains comments about the image file. Thus, the content checker 122 may access information stored in the comment extension block of the image file, even though information stored in the comment extension block is not visually rendered. In a similar manner, audio files and video files also contains comment blocks, which are portions of the file that are not audibly or visually rendered, as those portions contain comment information. In such audio and video files, the digital signature may be inserted into the comment blocks for eventual processing by the content checker 122.

Support for a Server-Side Include

Many Web sites are designed to employ a "server-side include," which allows a portion of content, such as the header, footer, or middle portion of a Web page to be dynamically included. In an embodiment, when the content signer 132 encounters the beginning of a server-side include block, the content signer 132 creates a digital signature for the content read thus far. Then, the content signer 132 skips the server-side include block (for the server-side include block must be associated with its own digital signature), and continues to read the next portion of content. The content signer 132 also creates a digital signature for the portion of content dynamically created for the server-side include block.

Since the content checker 122 may read a digital signature for each portion of the received version of content, a third-party is prevented from defacing the content, as the change will be reflected in the digital signature associated with the portion that was changed.

Progressional Verification

In an embodiment, instead of receiving the entire supplied version of content at once, the client may receive only a portion of the supplied version of content at a time. For example, if client 110 requests a streaming video file, the requested content is delivered to the client in sequential portions, rather than at once.

In such an embodiment, it may be advantageous to verify whether the received portions of content have been defaced without waiting until the entire requested content is received. A digital signature may be associated with a portion of the requested content, which may be delivered from the origin server 130 to the Web cache server 120 before the entire requested content is delivered.

For example, a progressionally signed document may have signatures inserted at locations such as:

<HTML>
<BODY>
This is first paragraph . . .
. . .
This is the fifth paragraph.
<!-- Signature: dfhdfi213jh -->
This is the sixth paragraph . . .
. . .
This is the thirteenth paragraph.
<!-- Signature: werrew324uio -->
This is fourteenth paragraph.
. . .
</BODY>
</HTML>
<!-- Signature: wererw32ui4 -->

In the above example, <!-- Signature: some-signature-- > represents the signature of the content starting either from the beginning or after the previous signature.

The Web cache server 120 may perform steps 220, 230, and 240 on the received portion of content, without waiting to receive the entire requested content.

In this way, the Web cache server 120 may verify that (a) that the received portions of content were actually sent from the content owner, and (b) that the received portions of content have not been defaced, as the received portions of content are received. Advantageously, the Web cache server 120 may quickly determine if a streaming audio or video file has been defaced, instead of waiting to determine if it has been defaced until the entire streaming audio or video file has been received.

Placing the Digital Signature in a Dedicated Position

In an embodiment wherein the content signer 132 associates the digital signature to a supplied version of content by inserting the digital signature into the supplied version of content, it may be advantageous for the content signer 132 to insert the digital signature into a known or fixed position of the supplied version of content, depending on the which type of content the supplied version of content is.

For example, if the supplied version of content is a Web page, then it may be advantageous for the content signer 132 to insert the digital signature into a fixed position on the Web page, so the content checker 122 may quickly ascertain what the digital signature is for the supplied version of content. This enables the content checker 122 to ascertain the digital signature associated with a supplied version of content without scanning or parsing through the supplied version of content; consequently, the content checker 122 does not need to be configured to read or parse the type of content of the supplied version of content, as the digital signature associated with the supplied version of content is in the same position.

To further illustrate, if the supplied version of content is a Web page, the content signer 132 may associate the digital signature to the Web page by inserting the digital signature into the header of the Web page or the footer of the Web page. Thus, the content checker 122 may quickly ascertain the digital signature associated with the Web page by only checking the header or footer of the Web page, without parsing through the remainder of the Web page.

Placing the Digital Signature in Dynamic Content

Embodiments of the invention may associate a digital signature with content that is dynamically generated. Dynamic content includes any content that does not exist at the time of request, and may include content that is generated by executing a script (such as JavaScript) or content that references one or more values that are evaluated at the time of request.

After dynamic content is generated, content signer 132 may associate a digital signature with the dynamic content. For example, content signer 132 may generate a digital signature for the dynamic content "on the fly" after the dynamic content is generated, prior to the transmission of the dynamic content to the Web cache server 120.

In an alternate embodiment, content signer 132 may not assign a digital signature to any file that is dynamically generated. In such an embodiment, the entity that performs steps 220, 230, and 240 may not perform those steps with respect to the dynamic content. In effect, the dynamic content is not checked to determine if it has been defaced. System 100 may be configured to not deliver the dynamic content upon request since it has not been verified as not having been defaced.

Although a Web cache server is mentioned above, the Web cache server modules described above can be implemented in any server, e.g., a standard Web server.

CDN Restoration

The CDN can be configured to save a validated copy of contents in Web cache server storage as a backup. There are three usages of the backup:
1. At origin site failure, the cache server can deliver the backup copy to requesting Web browsers.
2. When the Web cache server detects the defacement, the backup copy can be used instead of the defaced content.
3. A CDN customer can restore its origin site from the backup copies stored in Web cache storage.

Charging a Fee for Protecting Web Content

In an embodiment, the CDN service provider offers Web content defacement protection services to customers as an option to the CDN content caching and load-balancing services provided to the customers. A fee is charged for the Web cache servers to perform the Web content defacement checking as described above. The fee can be based on the number of Web cache servers involved, the number of the customer's documents that are delivered to clients (traffic), CPU time required to perform the defacement checking (e.g., this number will rise when the customer's origin servers are corrupted and deliver a large amount of defaced content files), etc.

The Web cache servers return statistics (e.g., number of files delivered, number of files found defaced, CPU usage, etc.) relating to the customer's cached content to a CDN administration server. The CDN administration server may have an accounting module that collects all of the information from the Web servers and separates the information on a per customer basis. The accounting module periodically bills each customer according to the customer's statistics and the basis on which the customer is charged (e.g., number of files delivered, number of files found defaced, CPU usage, etc.).

Since the Web cache servers monitor every aspect of the customer's content while the content is in the CDN network, a multitude of performance statistics can be measured and, therefore, any selected for calculating fees to the customer.

Decoding a Digital Signature at a Client

In an embodiment, instead of performing steps 220, 230, and 240 at Web cache server 120, steps 220, 230, and 240 are performed at client 110. In such an embodiment, client 110 is configured to perform the functions of content checker 122, security alerter 124, and key manager 126. Instead of Web cache server 120, decoding the digital signature, the Web cache server 120 transmits the requested content to client 110. The requested content comprises the digital signature. The client performs steps 220, 230, and 240 to decode the digital signature, apply the algorithm to obtain the determined content validity value, and thereafter determine if the supplied content has been defaced.

In an embodiment wherein client 110 is configured to perform steps of 220, 230, and 240 of FIG. 2, if client 110 determines that a supplied version of content has been defaced, then the client 110 may request a new version of the content from the Web cache server 120 or the origin server 130.

In another embodiment, instead of performing steps 220, 230, and 240 at Web cache server 120, steps 220, 230, and 240 are performed at a router, Web proxy, or Web intermediary, etc. The router, Web proxy, or Web intermediary may be positioned anywhere on communications link 140 between client 110 and Web cache server 120, or anywhere on communications link 142 between Web cache server 120 and origin server 130. In such an embodiment, a router, Web proxy, or Web intermediary that receives one or more packets containing content with a digital signature is configured to perform the functions of content checker 122, security alerter 124, and/or key manager 126. The router, Web proxy, or Web intermediary performs steps 220, 230, and 240 to decode the digital signature, apply the algorithm to obtain the determined content validity value, and thereafter determine if the supplied content has been defaced.

In an embodiment wherein a router, Web proxy, or Web intermediary is configured to perform steps of 220, 230, and 240 of FIG. 2, if the router, Web proxy, or Web intermediary determines that a supplied version of content has been defaced, then the router, Web proxy, or Web intermediary may use a similar policy as described above to decide what to do in the case of defacement.

Managing Keys Used for Encoding and Decoding

Key manager 126 and key manager 134 both provide an interface to allow an administrator to manage the keys used to encrypt and decode the digital signature. Key manager 126 allows an administrator to change the public keys associated with a content checker anytime, while key manager 134 allows an administrator to change the public keys associated with a content signer anytime. In an embodiment, the key manager provides a graphical user interface (GUI) that allows an administrator to add a new key, delete an existing key, and/or modify an existing key.

In an embodiment, key manager 126 and 134 may maintain information about prior keys used, such as a period of time when a key was valid. If content checker 122 receives supplied content that is associated with a prior valid key, content checker 122 may determine that a prior valid key may be used on the supplied content if the supplied content was last modified or encrypted during a period of time when the prior valid key was valid.

It is possible that a content provider may want to publish some modified content of a Website with a new key pair while keeping the existing files intact. In that case, the key manager 126 and 134 must track the new key as well as any old keys. Additionally, the content checker module 122 must use the new public key for the specific modified content and the old keys for other content.

A policy may be defined by the CDN administrator or the content provider that tells the CDN Web cache servers how to handle content for a specific content provider. For example, a partial policy may appear as follows:
Backup:
  Yes #options are yes or no
Validation:
  www.customer.com/marketing: validate
  www.customer.com/*.gif: validate
  www.customer.com/*.jpeg: validate
Alerting:
  Email: webmaster@customer.com
  Voicemail: 1-408-123-4567
Delivery:
  Return saved-good-copy In the above example, the defacement system is configured to:
1. Backup a good copy of the current content in the CDN storage. Of course, this means additional storage space is required for the CDN customer and the customer will most likely be charged a higher service fee.
2. Validate all pages under URL marking and all image files. Options for validation include: static, dynamic or all pages. Note that regular expressions can be used so that the rules can be flexible.
3. Return a saved good copy upon detection of content defacement.

Implementing Mechanisms

Figure 3:
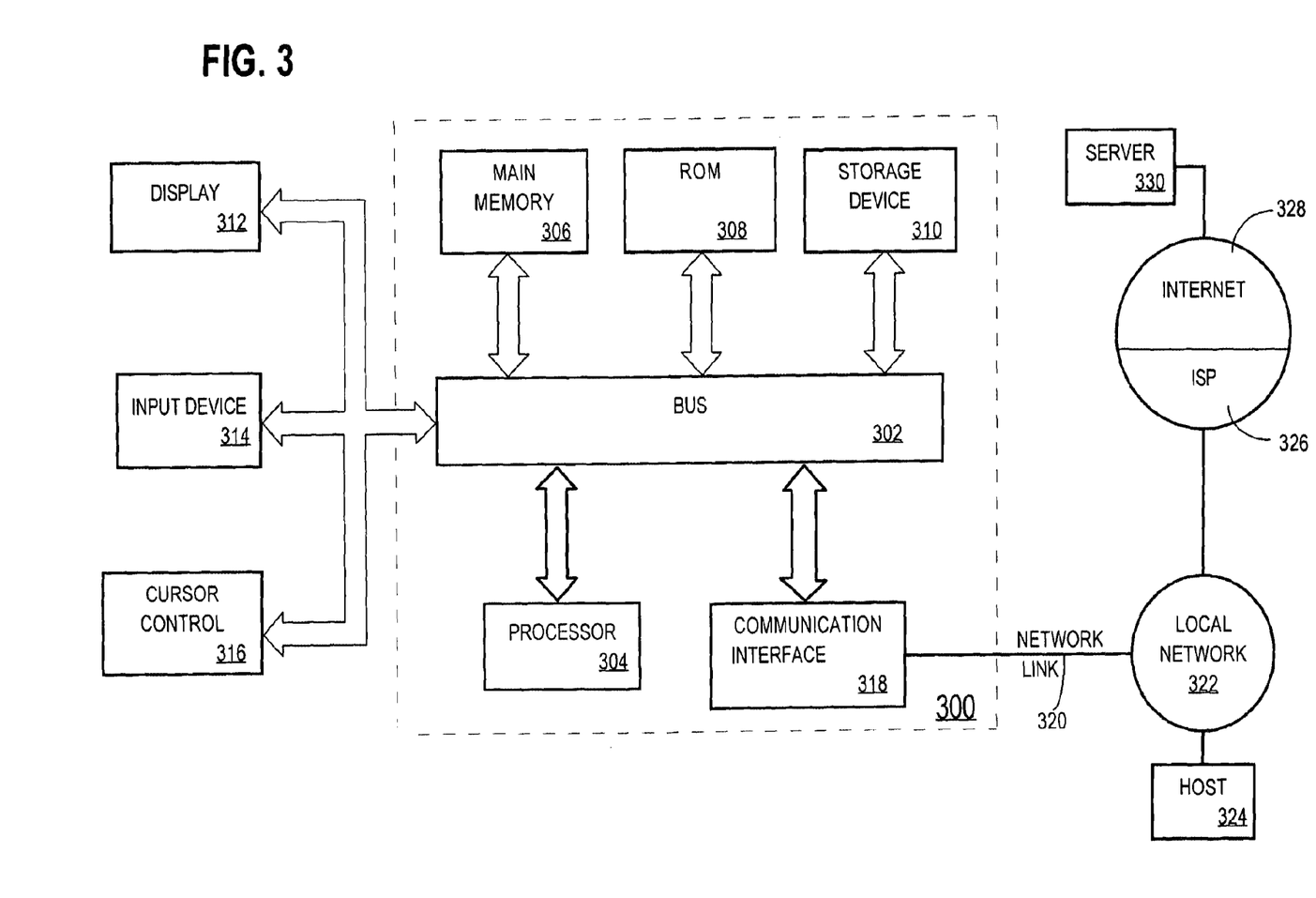
FIG. 3 is a block diagram that illustrates a computer system upon which an embodiment of the invention may be implemented.

A client, a Web cache server, and an origin server may each be implemented on a computer system according to an embodiment of the invention. FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method for content defacement protection, comprising:
    receiving, at a proxy server in a content delivery network (CDN), a request from a client for streaming content, the CDN being operated by a CDN service provider on behalf of one or more content owners who use the CDN to serve said streaming content from an origin server to requesting clients;
    requesting, with the proxy server, at least one portion of a plurality of portions of streaming content from the origin server, wherein each of said plurality of portions of said streaming content is associated with a corresponding digital signature that can be decoded to obtain a supplied content validity value for that portion;
    receiving, at the proxy server, said one portion of said streaming content from the origin server;
    at the proxy server, decoding the digital signature associated with said one portion of said streaming content to obtain the supplied content validity value for said one portion of said streaming content;
    computing a determined content validity value based on said one portion of said streaming content;
    determining whether said supplied content validity value and said determined content validity value are the same;
    when said supplied content validity value and said determined content validity value are the same, the proxy server serving said one portion of said streaming content to the client, in response to the request for said streaming content from the client;
    the proxy server taking an action other than serving said one portion of said streaming content to the client, when said supplied content validity value and said determined content validity value are different;
    wherein the CDN service provider receives information from the one or more content owners that configures the action to be taken when said supplied content validity value and said determined content validity value are different.

2. The method of claim 1, wherein said streaming content comprises at least one of a video file and an audio file.

3. The method of claim 1, wherein the proxy server determines whether said supplied content validity value and said determined content validity value are the same without waiting to receive a subsequent portion of said streaming content from the origin server.

4. The method of claim 1, further comprising:
    requesting, by the proxy server, a new version of said one portion of said streaming content from another server upon determining that said supplied content validity value and said determined content validity value are different.

5. The method of claim 1, further comprising:
    serving, by the proxy server, a saved older version of said one portion of said streaming content stored in the CDN, in response to the request for said streaming content from the client, upon determining that said supplied content validity value and said determined content validity value are different.

6. The method of claim 1, further comprising:
    serving, by the proxy server, any of (i) a content provider's default Web page and (ii) a security announcement page, in response to the request for said streaming content from the client, upon determining that said supplied content validity value and said determined content validity value are different.

7. The method of claim 1, further comprising:
    informing an administrator that said one portion of said streaming content is corrupted upon determining that said supplied content validity value and said determined content validity value are different; and
    wherein said step of informing the administrator comprises performing any of the following acts: sending an email to the administrator, paging the administrator, displaying a message on a user interface accessible to the administrator, transmitting a voice-mail to the administrator, issuing a SNMP trap, or calling the administrator.

8. The method of claim 1, wherein said digital signature is encoded using a first key, and wherein said step of decoding said digital signature further comprises decoding said digital signature using a second key associated with said origin server, the second key being the same as or different than the first key.

9. The method of claim 1, further comprising, with the proxy server:
    receiving another portion of said streaming content from the origin server,
    decoding the digital signature associated with said another portion of said streaming content to obtain a supplied content validity value therefor;
    computing a determined content validity value based on said another portion of said streaming content;
    determining whether said supplied content validity value and said determined content validity value for said another portion are the same;
    when said supplied content validity value and said determined content validity value for said another portion are the same, the proxy server serving said another portion of said streaming content to the client, in response to the request for said streaming content from the client;
    taking an action other than serving said another portion of said streaming content to the client, when said supplied content validity value and said determined content validity value for said another portion are different.

10. A proxy server in a content delivery network (CDN), wherein the CDN is operated by a CDN service provider on behalf of one or more content owners who use the CDN to serve said streaming content from an origin server to requesting clients, the proxy server comprising:
    hardware circuitry forming one or more processors,
    a communication interface coupled to a computer network, and
    memory storing instructions for execution by the one or more processors;
    wherein the proxy server includes instructions that, when executed by the one or more processors, cause the proxy server to:
      (i) receive a request from a client for streaming content;
      (ii) request at least one portion of a plurality of portions of said streaming content from an origin server, wherein each of said plurality of portions of said streaming content is associated with a corresponding digital signature that can be decoded to obtain a supplied content validity value for that portion;
      (iii) receive said one portion of said streaming content from the origin server;
      (iv) decode the digital signature associated with said one portion of said streaming content to obtain the supplied content validity value for said one portion of said streaming content;

(v) compute a determined content validity value based on said one portion of said streaming content;

(vi) determine whether said supplied content validity value and said determined content validity value are the same;

(vii) when said supplied content validity value and said determined content validity value are the same, serve said one portion of said streaming content to the client, in response to the request for said streaming content from the client;

(viii) take an action other than serving said one portion of said streaming content to the client, when said supplied content validity value and said determined content validity value are different;

wherein the proxy server receives information that came from the one or more content owners that configures the action to be taken when said supplied content validity value and said determined content validity value are different.

11. The proxy server of claim 10, wherein said streaming content comprises at least one of a video file and an audio file.

12. The proxy server of claim 10, wherein the memory of the proxy server includes instructions that, when executed by the one or more processors, cause the proxy server to determine whether said supplied content validity value and said determined content validity value are the same without waiting to receive a subsequent portion of said streaming content from the origin server.

13. The proxy server of claim 10, wherein the memory of the proxy server includes instructions that, when executed by the one or more processors, cause the proxy server to:
request a new version of said one portion of said streaming content from another server upon determining that said supplied content validity value and said determined content validity value are different.

14. The proxy server of claim 10, wherein the memory of the proxy server includes instructions that, when executed by the one or more processors, cause the proxy server to serve a saved older version of said one portion of streaming content stored at the proxy server to the client, upon determining that said supplied content validity value and said determined content validity value are different.

15. The proxy server of claim 10, wherein the memory of the proxy server includes instructions that, when executed by the one or more processors, cause the proxy server to serve any of (i) a content provider's default Web page and (ii) a security announcement page, to a client upon determining that said supplied content validity value and said determined content validity value are different.

16. The proxy server of claim 10, wherein the memory of the proxy server includes instructions that, when executed by the one or more processors, cause the proxy server to inform an administrator that said one portion of said streaming content is corrupted upon determining that said supplied content validity value and said determined content validity value are different; and wherein said step of informing the administrator comprises performing any of the following acts: sending an email to the administrator, paging the administrator, displaying a message on a user interface accessible to the administrator, transmitting a voice-mail to the administrator, issuing a SNMP trap, or calling the administrator.

17. The proxy server of claim 10, wherein said digital signature is encoded using a first key, and wherein decoding said digital signature further comprises decoding said digital signature using a second key associated with said origin server, the second key being the same as or different than the first key.

18. A computer system, comprising:
a plurality of servers connected via one or more computer networks, each of the plurality of servers having hardware circuitry forming one or more processors, a communication interface coupled to the computer network, and memory storing instructions for execution by the one or more processors, the plurality of servers including a proxy server in a content delivery network (CDN) and an origin server;

wherein the CDN is operated by a CDN service provider on behalf of one or more content owners who use the CDN to serve streaming content from the origin server to requesting clients;

wherein the memory of the proxy server includes instructions that, when executed by the one or more processors, cause the proxy server to:
(i) receive a request from a client for streaming content;

(ii) request at least one portion of a plurality of portions of said streaming content from an origin server, wherein each of said plurality of portions of said streaming content is associated with a corresponding digital signature that can be decoded to obtain a supplied content validity value for that portion;

(iii) receive said one portion of said streaming content from the origin server;

(iv) decode the digital signature associated with said one portion of said streaming content to obtain the supplied content validity value for said one portion of said streaming content;

(v) compute a determined content validity value based on said one portion of said streaming content;

(vi) determine whether said supplied content validity value and said determined content validity value are the same;

(vi) when said supplied content validity value and said determined content validity value are the same, serve said one portion of said streaming content to the client, in response to the request for said streaming content from the client;

(vii) take an action other than serving said at least one portion of said streaming content to the client, when said supplied content validity value and said determined content validity value are different;

wherein the CDN service provider receives information from the one or more content owners that configures the action to be taken when said supplied content validity value and said determined content validity value are different.

19. The computer system of claim 18, wherein said streaming content comprises at least one of a video file and an audio file.

20. The computer system of claim 18, wherein the memory of the proxy server includes instructions that, when executed by the one or more processors, cause the proxy server to:
request a new version of said one portion of said streaming content from another server upon determining that said supplied content validity value and said determined content validity value are different.

21. The computer system of claim 18, wherein the memory of the proxy server includes instructions that, when executed by the one or more processors, cause the proxy server to serve a saved older version of said one portion of said streaming content stored at the proxy server to the client, upon determining that said supplied content validity value and said determined content validity value are different.

* * * * *